United States Patent
Johnson et al.

(10) Patent No.: US 12,061,379 B2
(45) Date of Patent: *Aug. 13, 2024

(54) DUAL PORT CONSTRAINED ACOUSTIC VOLUME

(71) Applicant: Snap Inc., Santa Monica, CA (US)

(72) Inventors: Dillon Johnson, Marina Del Rey, CA (US); Daniel C. Wiggins, Port Hueneme, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,580

(22) Filed: Feb. 9, 2023

(65) Prior Publication Data

US 2023/0185113 A1 Jun. 15, 2023

Related U.S. Application Data

(63) Continuation of application No. 16/834,535, filed on Mar. 30, 2020, now Pat. No. 11,598,979.

(51) Int. Cl.
*H04R 1/02* (2006.01)
*G02C 11/00* (2006.01)
*G02C 13/00* (2006.01)

(52) U.S. Cl.
CPC ............ *G02C 11/10* (2013.01); *G02C 13/001* (2013.01); *H04R 1/028* (2013.01); *H04R 2420/07* (2013.01)

(58) Field of Classification Search
CPC .......................... H04R 1/028; H04R 2420/07; H04R 2499/10; G02C 11/10

USPC .................. 381/74, 367, 376, 380, 334, 381
See application file for complete search history.

(56) References Cited

U.S. PATENT DOCUMENTS

| | | | | |
|---|---|---|---|---|
| 3,825,700 | A * | 7/1974 | Jerry ....................... | G02C 11/06 381/330 |
| 5,164,987 | A * | 11/1992 | Raven .................. | H04R 1/1066 381/381 |
| 7,380,936 | B2 * | 6/2008 | Howell .................. | G02C 5/001 351/158 |
| 7,500,747 | B2 * | 3/2009 | Howell .................. | G02C 11/06 351/158 |
| 8,139,801 | B2 * | 3/2012 | Sipkema .............. | H04R 25/405 381/313 |
| 9,031,265 | B2 | 5/2015 | Fukushima et al. | |
| 9,161,113 | B1 * | 10/2015 | Fenton ................. | H04R 25/604 |
| 10,015,577 | B2 | 7/2018 | Abreu | |
| 10,310,296 | B2 * | 6/2019 | Howell .................. | G02C 11/10 |
| 10,345,625 | B2 * | 7/2019 | Howell .................... | G02C 5/14 |
| 10,555,071 | B2 * | 2/2020 | Wakeland ............ | H04R 1/1008 |
| 10,951,976 | B2 * | 3/2021 | Wakeland ................ | H04R 1/24 |
| 11,082,765 | B2 | 8/2021 | Khaleghimeybodi et al. | |
| 11,243,416 | B2 | 2/2022 | Howell et al. | |
| 11,307,412 | B1 | 4/2022 | Meisenholder | |
| 11,598,979 | B1 | 3/2023 | Johnson et al. | |
| 2012/0314883 | A1 | 12/2012 | Kang et al. | |
| 2019/0098392 | A1 | 3/2019 | Abreu | |

(Continued)

*Primary Examiner* — Disler Paul (74) *Attorney, Agent, or Firm* — Culhane PLLC; Stephen J. Weed (57) ABSTRACT

A portable eyewear electronic device that includes a speaker module and methods of assembly of the device are presented. The electronic eyewear device includes a speaker module that emits acoustic radiation that is channeled through a carrier contained within a temple to one or more acoustic ports near a user's ear.

20 Claims, 7 Drawing Sheets

(56) References Cited

U.S. PATENT DOCUMENTS

2019/0278110 A1  9/2019  Howell et al.
2020/0314326 A1  10/2020 Rodriguez et al.

* cited by examiner

DUAL PORT CONSTRAINED ACOUSTIC VOLUME

CROSS-REFERENCE TO RELATED APPLICATIONS

This application is a Continuation of U.S. application Ser. No. 16/834,535 filed on Mar. 30, 2020, the contents of which are incorporated fully herein by reference.

TECHNICAL FIELD

Examples set forth in the present disclosure relate to portable electronic devices, including wearable electronic devices such as eyeglasses. More particularly, but not by way of limitation, the present disclosure describes an electronic eyewear device with a dual port constrained acoustic volume.

BACKGROUND

Many electronic devices available today include wearable consumer electronic devices. Wearable consumer electronic devices may include audio but face strict size limitations that adversely affect audio volume.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

An electronic eyewear device comprising an electroacoustic transducer or speaker module includes an acoustic driver or radiator that emits acoustic radiation. The speaker module is held in receptive engagement by a carrier received into the frame of the electronic eyewear device. Acoustic radiation is emitted from a speaker module through a constrained volume and emitted through at least one acoustic port.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "connect", "connected", "couple" and "coupled" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Electronic eyewear devices produce sound using an acoustic driver that is spaced from the ear. Such headphones should ideally deliver high-quality sound to the ears at desired volumes. Electronic eyewear device can include speaker modules built into one or more of the temples of the electronic eyewear device.

An electronic eyewear device comprising a speaker module includes an acoustic driver or radiator that emits acoustic radiation. The speaker module is held in receptive engagement by a carrier received into the frame of the electronic eyewear device. At least one acoustic port allow sound to leave the frame.

The electronic eyewear device includes an acoustic transducer to transduce audio signals to acoustic energy or radiation. While some of the figures and descriptions following show a single speaker module, the electronic eyewear device may be a single stand-alone unit or one of a pair of speaker modules (each including at least one acoustic driver), one arranged to provide sound to each ear. The electronic eyewear device may be connected mechanically to another speaker module, for example by the device frame, or by another structure, or by leads that conduct audio signals to an acoustic driver in the electronic eyewear device, or by a combination thereof. An electronic eyewear device may include components for wirelessly receiving audio signals.

Figure 1:
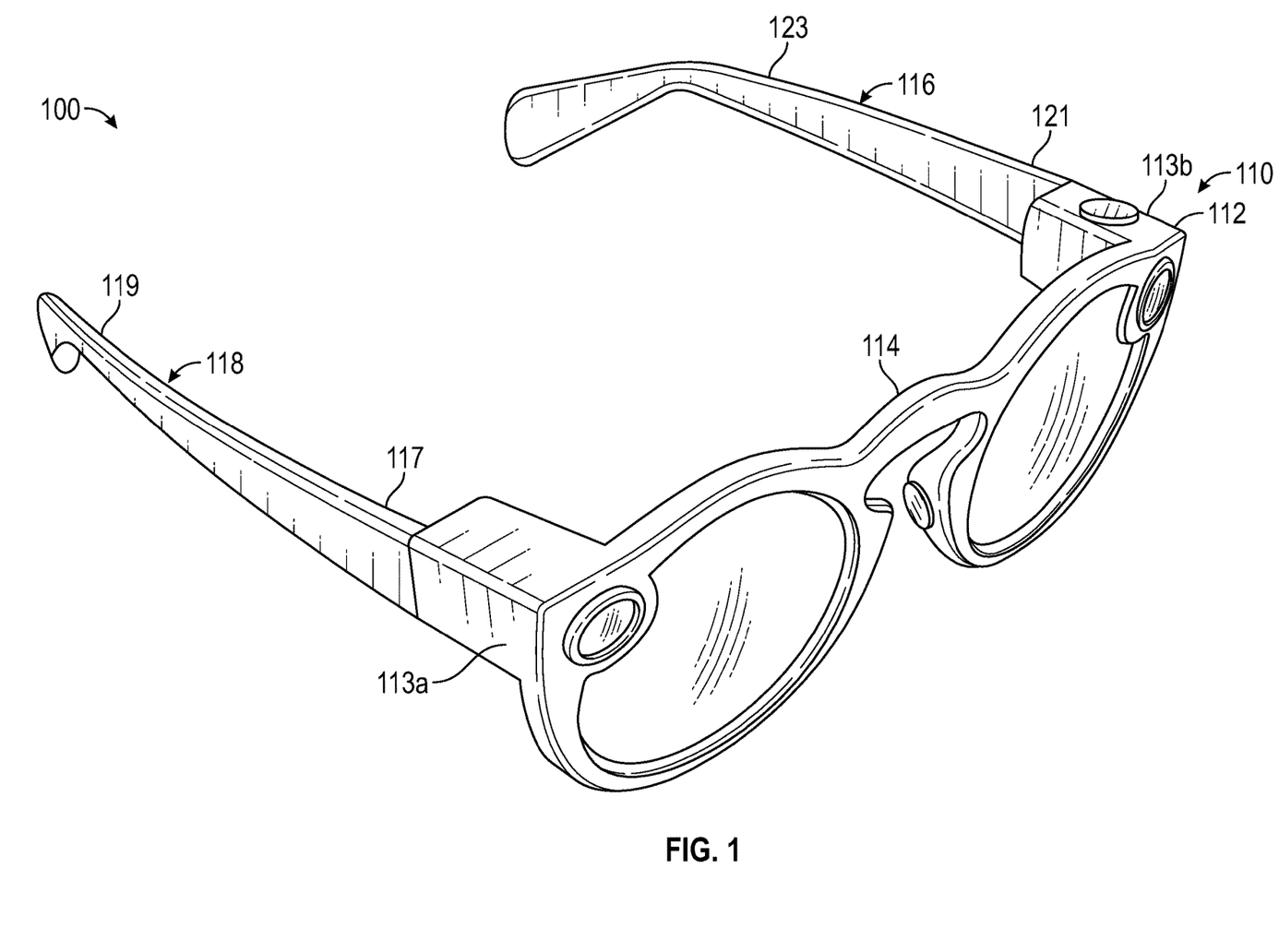
FIG. 1 is a front perspective view of an example electronic eyewear device configuration.
Figure 2:
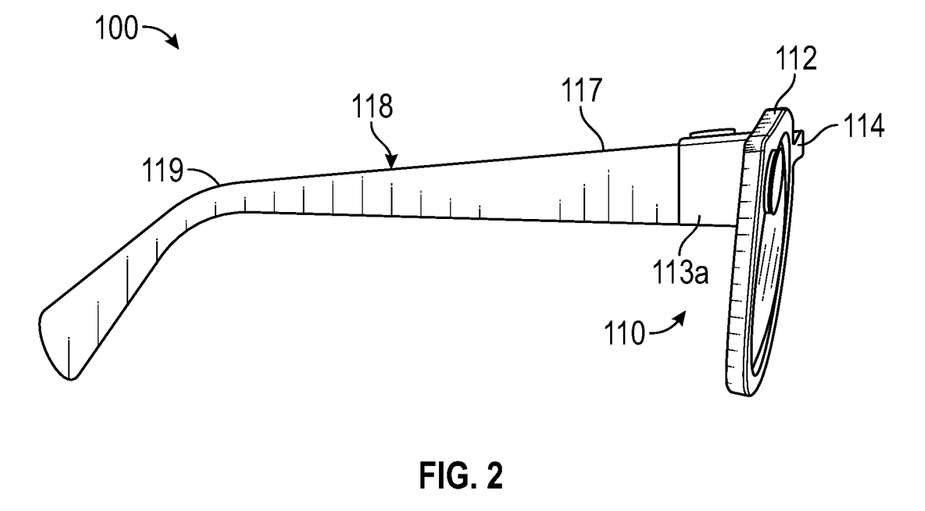
FIG. 2 is a left side view of the electronic eyewear device of FIG. 1.
Figure 3:
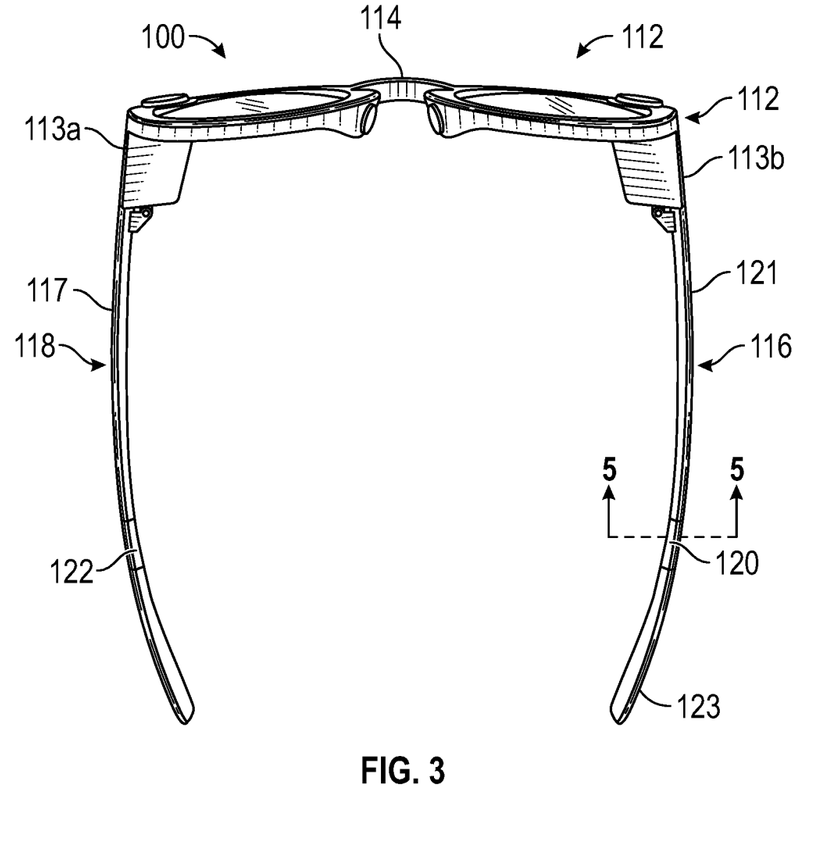
FIG. 3 is a bottom plan view of the electronic eyewear device of FIG. 1 showing acoustic ports in accordance with an example.

FIG. 1 is a front perspective view and FIG. 2 is a right side view of electronic eyewear device 100. In this non-limiting example, there is a front area 110 that includes frame 112 that includes a bridge 114 that is constructed and arranged to sit on the nose. Left temple 116 is coupled to bridge 114 and of sufficient length to extend over the left ear of a user. Right temple 118 is coupled to bridge 114 and extends over the right ear. Right temple 118 includes main section 117 and an ear section 119 and left temple 116 includes main section 121 and ear section 123. Also shown in this view are chunks 113a and 113b. At least one temple comprises a speaker module and a carrier as explained below. FIG. 3 is a bottom plan view of the electronic eyewear device 100 showing acoustic ports 120 and 122 of left and right temples 116 and 118, respectively. In some examples, at least one acoustic port may face medially toward the user's ear(s).

Figure 4:
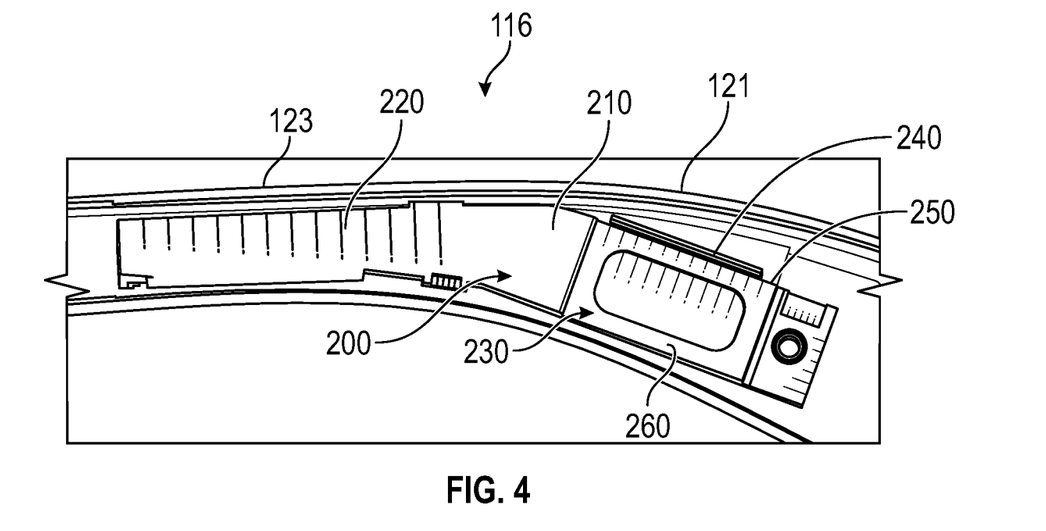
FIG. 4 is a partial longitudinal sectional view of the left temple of FIG. 1 showing internal structure and the carrier in accordance with an example.

FIG. 4 is a longitudinal sectional view showing the carrier 200 set in cavity or elongated internal space 124 of the left temple 116. Carrier 200 includes a main portion 210 and an ear portion 220 that substantially coincide with the internal spaces of the main and ear sections 121, 123 of the temple. The main portion 210 of carrier 200 further comprises a speaker module area 230 for receiving a speaker module 300 (see FIG. 6) and also includes retainer 240 along the first edge 250 of the carrier 200 for aiding in retaining speaker module 300. In one example the speaker module area or zone 230 comprises an opening 260 that acoustic radiation generated by the speaker module passes. In some examples, the opening 260 is smaller than the outline of speaker module such as depicted. Various fasteners, clips, or adhesive may be used to mount the speaker module 300 to carrier speaker module area 230.

Figure 5:
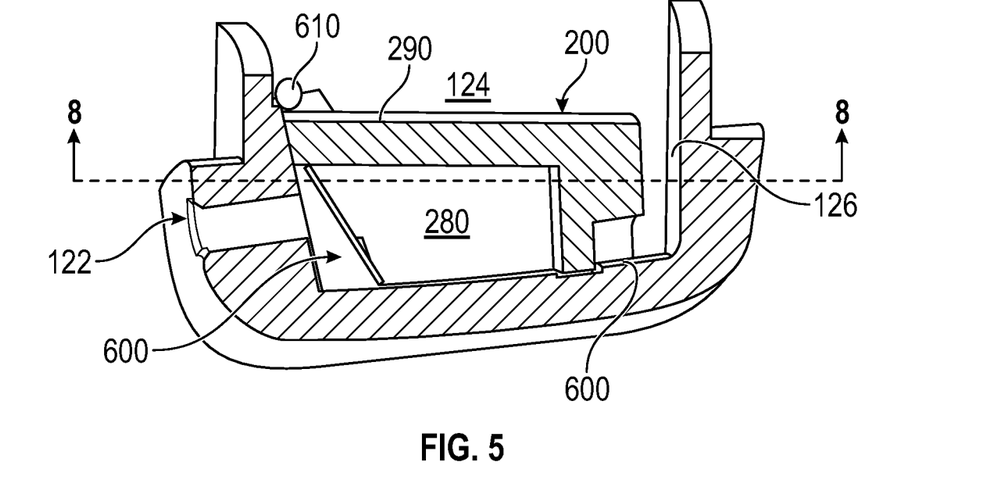
FIG. 5 is a cross-sectional view along line 5-5 of the left temple shown in FIG. 2 in accordance with an example.

FIG. 5 is a cross-sectional along line 5-5 of FIG. 2 through acoustic port 120 of left temple 116 showing the carrier in receptive engagement within internal space 124. As shown, the temple has a substantially U-shaped cross-section profile forming internal space 124 defined by inner wall 126, such that when carrier 200, which in this example configuration has a substantially L-shaped profile, is positioned in internal space 124 and abuts against the interior surface of inner wall 126 forms acoustic channel or volume 280 through which acoustic radiation produced by speaker module 300 may flow and exits via acoustic port 122. The carrier is held in position via an adhesive path 600 (see FIG. 6). Additional adhesive material may be placed in areas on the outer surface 290 of carrier 200 where it abuts inner wall 126, such as at area 610 (but the glue path should not obstruct the acoustic port(s)). In some examples, the adhesive path 600 is of a material or in an amount or both to increase acoustic impedance. In some examples, the adhesive material is an epoxy. In some examples, the adhesive is preferably formulated to have a viscosity and sufficient pot life so that the carrier 200 can be placed whereby the adhesive does not prematurely cure. The adhesive may be UV-curable. The adhesive may comprise an epoxy resin, Epoxy resin is used herein to mean any of the conventional dimeric, oligomeric or polymeric epoxy materials containing at least one epoxy functional group. The epoxy resin may be a bisphenol-A epoxy resin. The epoxy resin may comprise from about 2% to about 80% by weight of the adhesive. The epoxy resin may comprise from about 15% to about 60% by weight of the adhesive. The epoxy resin may comprise at least about 15% by weight of the adhesive. The epoxy resin may comprise less than about 60% by weight of the adhesive. The epoxy resin may be a liquid or a solid epoxy resin or may be a combination of liquid and solid epoxy resins.

The adhesive may include an elastomer. Exemplary elastomers include, without limitation, natural rubber, styrene-butadiene rubber, polyisoprene, polyisobutylene, polyvinyl, polybutadiene, isoprene-butadiene copolymer, neoprene, nitrile rubber (e.g., a butyl nitrile, such as carboxy-terminated butyl nitrile (CTBN)), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like.

The adhesive may also include one or more additional polymer or copolymer materials, such as thermoplastics, elastomers, elastomers, combinations thereof or the like. Polymers that might be appropriately incorporated into the adhesive include halogenated polymers, core/shell polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, poly (vinyl chloride), poly(methyl methacrylate), poly(vinyl acetate), poly(vinylidene chloride), polytetrafluoroethylene, polyisoprene, polyacrylamide, polyacrylic acid, polymethacrylate.

The adhesive may also include a variety of curing agents and fillers. Examples of suitable curing agents include materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bis-hydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the adhesive. Another preferred curing agent is dihydrazides, particularly isophthalic dihydrazide.

Figure 6:
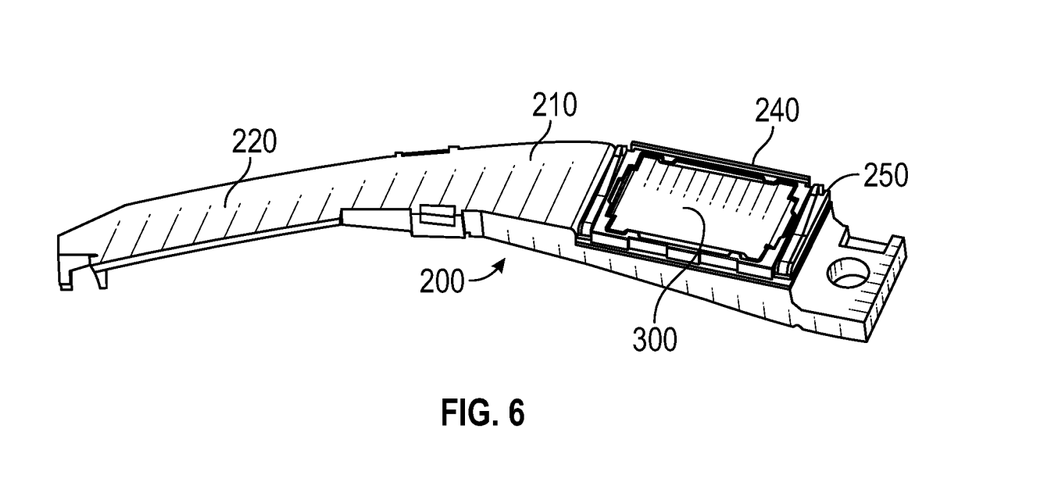
FIG. 6 is a perspective view of an example configuration of the carrier and speaker module in accordance with an example.
Figure 9:
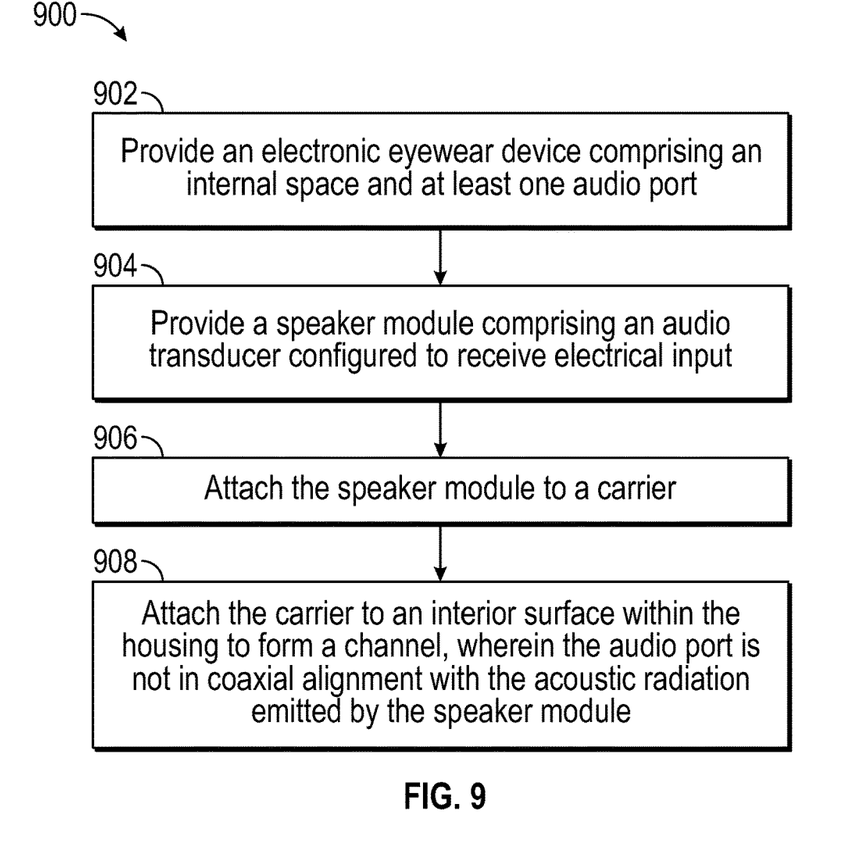
FIG. 9 is a flow diagram of an example method of assembling an electronic eyewear device in accordance with an example.

FIG. 6 is a perspective view of the speaker module 300 affixed to module zone 230 of the carrier 200 prior to insertion within the cavity 124 of the temple, for instance, as in step 906 of the example method shown in FIG. 9.

Figure 7:
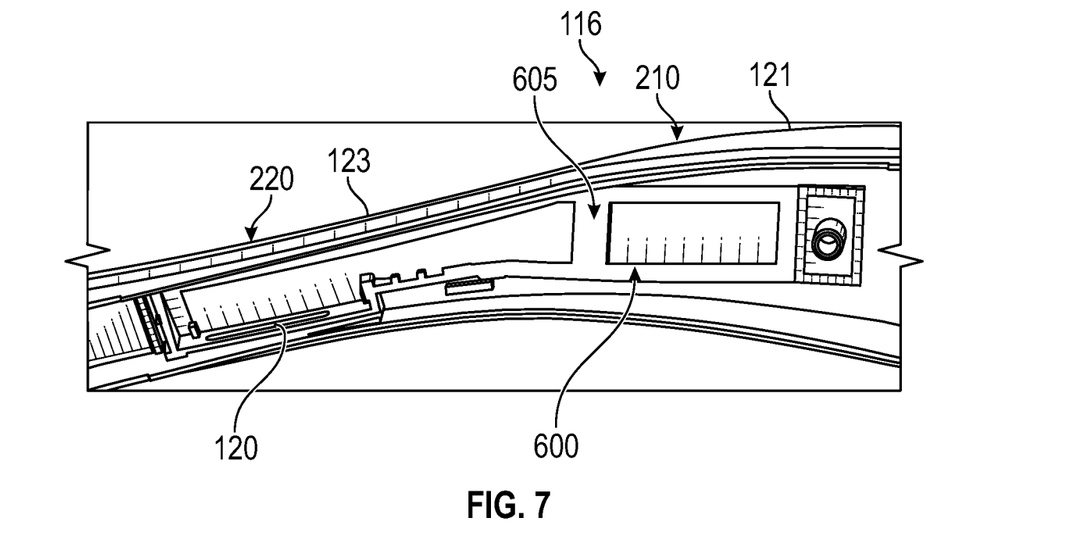
FIG. 7 is a partial longitudinal sectional view of the left temple of FIG. 1 showing the internal space prior to assembly of the carrier in accordance with an example.

FIG. 7 is a perspective view of the inner wall of the inner longitudinal section showing one example of a glue path 600 for carrier 200 prior to receptive engagement. In this view the glue path 600 is shown around the acoustic port and traces a perimeter coextensive with the outer perimeter of carrier 200 except for an additional segment 605 that circumscribes the perimeter of the carrier speaker zone 230.

Figure 8:
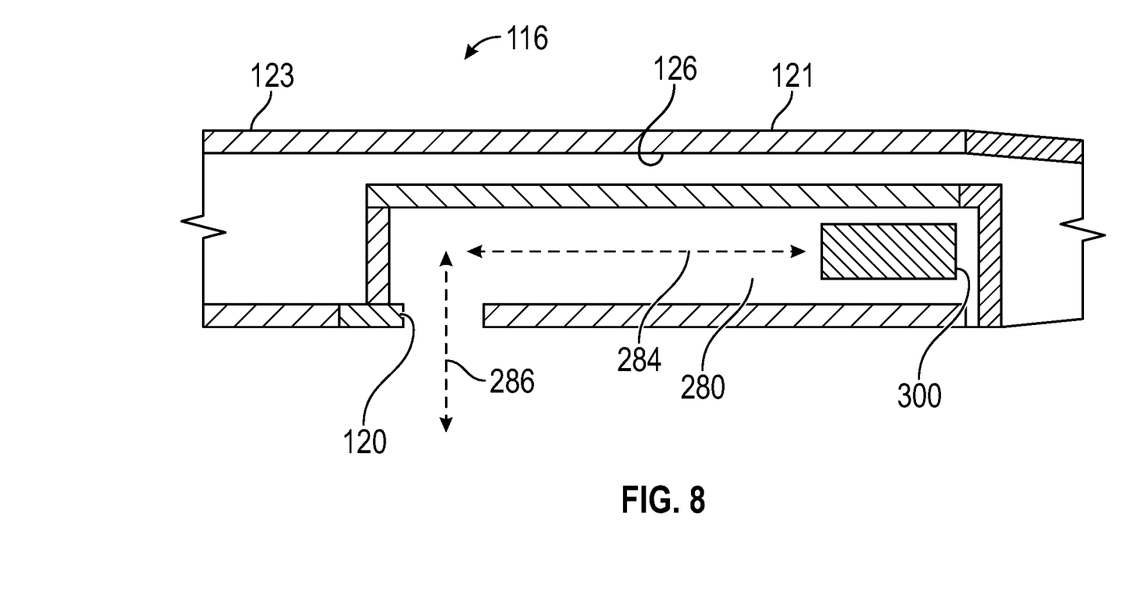
FIG. 8 is a schematic top plan view taken along line 10-10 of FIG. 5 showing the dual port constrained volume in accordance with an example.

FIG. 8 is a schematic plan view along line 8-8 of FIG. 5 that depicts the placement of the speaker module 300 that allows the sound created from the module to be conducted through channel 280 along axis 284 defined by the carrier and inner temple wall 126 from main area 117 to ear area 119 then emitted through acoustic port 120 substantially along axis 286 to be received by the wearer's ear.

FIG. 9 is a flow diagram illustrating the steps of an example method 900 of assembling an electronic eyewear device having an improved constrained acoustic volume. In step 902, the method includes the step of providing an electronic eyewear device comprising a housing having an internal space and at least one audio port. In step 904, the method includes the step of providing a speaker module comprising an audio transducer configured to receive electrical input. In step 906, the method includes the step of attaching the speaker module to a carrier, as shown, for example, in FIG. 6. In step 908, the method includes the step of attaching the carrier to an interior surface within the housing that comprises at least one audio port. In some aspects, multiple audio ports are provided in the temple wall. In one aspect, the speaker module is located in the carrier such that acoustic radiation emitted by the speaker module along a radiation axis is not in coaxial alignment with at least one audio port. In another aspect, the emitted acoustic radiation from the speaker module is emitted along a radiation axis that is in coaxial non-alignment with the audio port.

Figure 10:
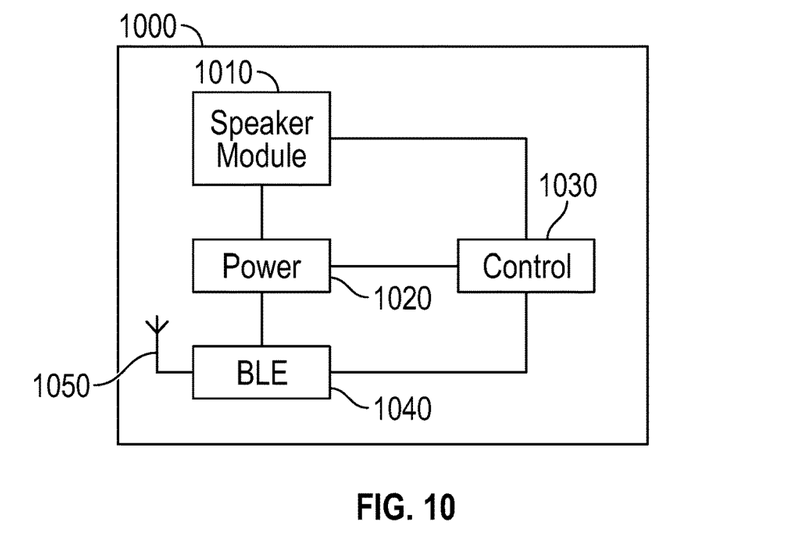
FIG. 10 is a block diagram of the electrical system of the device for producing acoustic output in accordance with an example.

FIG. 10 is a functional block diagram that represents an example electrical system of the electronic eyewear device for producing sound via speaker module. System 1000 includes a speaker module 1010 driven by control and amplification module 1030. BLE unit 1040 is electrically coupled to antenna 1050, and is functionally coupled to module 1030. Power is provided to all powered components by power source (e.g., rechargeable battery) 1020. The components shown in FIG. 10 for the electronic eyewear device 100 may be located in the frame or temples.

Figure 11:
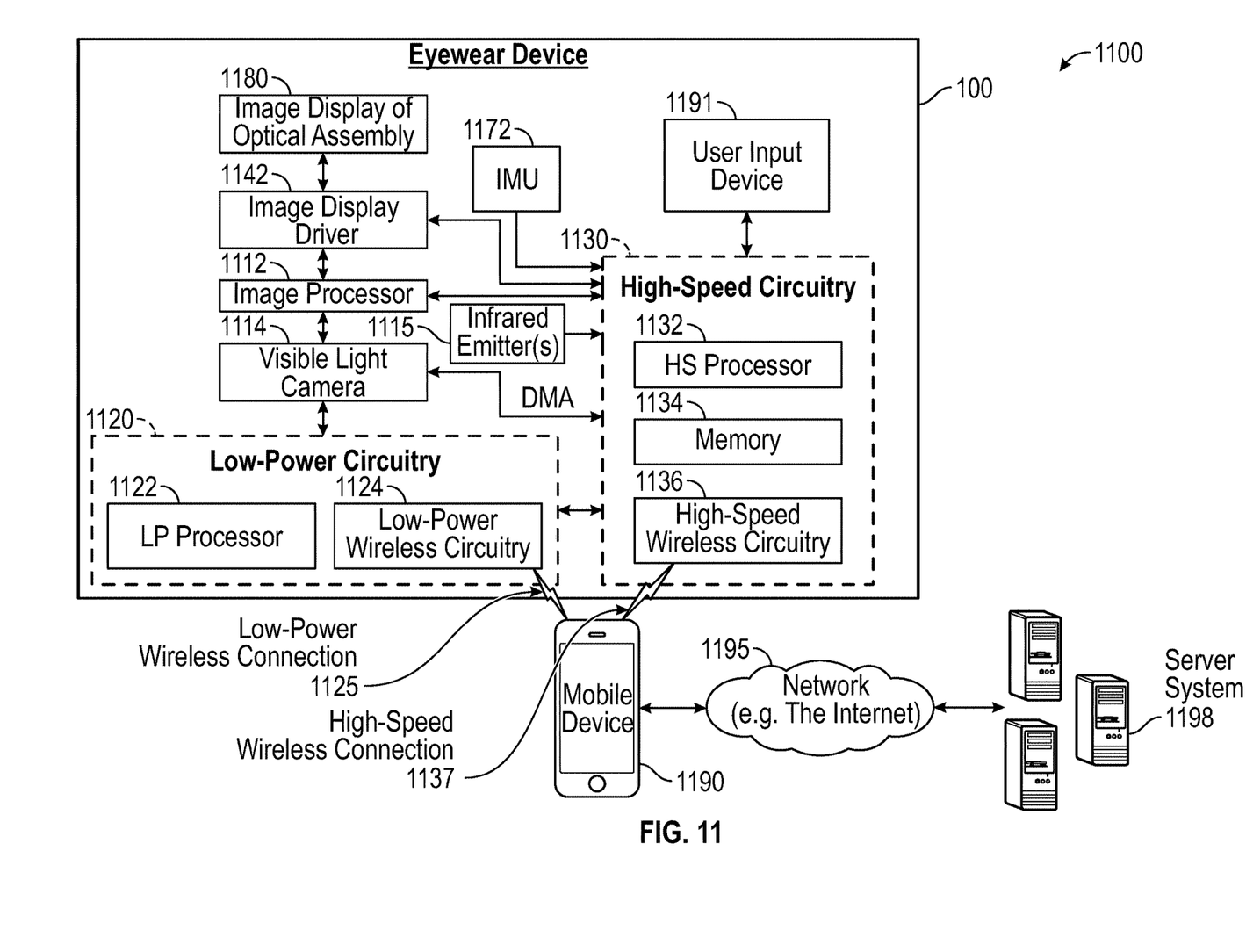
FIG. 11 is a diagrammatic representation of an example acoustic circuitry and use of an eyewear electronic device in communication with a mobile device and a server system connected via various networks.

FIG. 11 is a block diagram that depicts another example for the components for the electronic eyewear device 100 including those of FIG. 10, which may be located on one or more circuit boards located in the frame or temples, or alternatively or additionally, in the chunks 113, frame 122, hinges (not shown) or bridge 114 of electronic eyewear device 100.

As shown in FIG. 11, circuitry 1130 includes a high-speed processor 1132, a memory 1134, and high-speed wireless circuitry 1136. In the example, the image display driver 1142 is coupled to the high-speed circuitry 1130 and operated by the high-speed processor 1132 in order to drive the left and right image displays of electronic eyewear device having optical assemblies. High-speed processor 1132 may be any processor capable of managing high-speed communications and operation of any general computing system needed for electronic eyewear device 100. High-speed processor 1132 includes processing resources needed for managing high-speed data transfers on high-speed wireless connection 1137 to a wireless local area network (WLAN) using high-speed wireless circuitry 1136. In certain examples, the high-speed processor 1132 executes an operating system such as a LINUX operating system or other such operating system of the electronic eyewear device 100 and the operating system is stored in memory 1134 for execution. In addition to any other responsibilities, the high-speed processor 1132 executes a software architecture for the electronic eyewear device 100 that is used to manage data transfers with high-speed wireless circuitry 1136. In certain examples, high-speed wireless circuitry 1136 is configured to implement Institute of Electrical and Electronic Engineers (IEEE) 802.11 communication standards, also referred to herein as Wi-Fi. In other examples, other high-speed communications standards may be implemented by high-speed wireless circuitry 1136.

The low-power circuitry 1120 includes a low-power processor 1122 and low-power wireless circuitry 1124. The low-power wireless circuitry 1124 and the high-speed wireless circuitry 1136 of the electronic eyewear device 100 can include short range transceivers (Bluetooth™) and wireless wide, local, or wide-area network transceivers (e.g., cellular or WiFi). Mobile device 1190, including the transceivers communicating via the low-power wireless connection 1125 and the high-speed wireless connection 1137, may be implemented using details of the architecture of the electronic eyewear device 100, as can other elements of the network 1195.

Memory 934 includes any storage device capable of storing various data and applications, including, among other things, camera data generated by camera(s), the image processor 1112, and images generated for display by image display driver 1142 on the image display of optical assemblies. Although the memory 1134 is shown as integrated with high-speed circuitry 1130, the memory 1134 in other examples may be an independent, standalone element of the electronic eyewear device 100. In certain such examples, electrical routing lines may provide a connection through a chip that includes the high-speed processor 1132 from the image processor 1112 or low-power processor 1122 to the memory 1134. In other examples, the high-speed processor 1132 may manage addressing of memory 1134 such that the low-power processor 1122 will boot the high-speed processor 1132 any time that a read or write operation involving memory 1134 is needed.

As shown in FIG. 4, the high-speed processor 1132 of the electronic eyewear device 100 can be coupled to the camera system, the image display driver 1142, the user input device 1191, and the memory 1134.

The output components of the electronic eyewear device 100 include visual elements, such as the left and right image displays associated with each lens or optical assembly (not shown), a plasma display panel (PDP), a light emitting diode (LED) display, a projector, or a waveguide. The eyewear device 100 may include a user-facing indicator (e.g., an LED or a vibrating actuator), an outward-facing signal (e.g., an LED), or both. The image displays 1180 of each optical assembly are driven by the image display driver 1142. In some example configurations, the output components of the electronic eyewear device 100 further include additional indicators such as tactile components (e.g., an actuator such as a vibratory motor to generate haptic feedback), and other signal generators. The user-facing set of indicators are configured to be seen or otherwise sensed by the user of the device 100. For example, the device 100 may include an LED display positioned so the user can see it, a loudspeaker positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force, or location and force of touches or touch gestures, or other tactile-configured elements), and audio input components (e.g., a microphone), and the like. The mobile device 1190 and the server system 1198 may include alphanumeric, pointer-based, tactile, audio, and other input components.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device, comprising:
 a frame configured to be worn on the head of a user, the frame comprising an eyeglass section and a temple extending rearwardly from the eyeglass section, the temple comprising an internal space having an inner wall and an acoustic port having an acoustic port axis;
 an L-shaped carrier configured to be received within the internal space and to engage the inner wall of the temple to form a channel; and
 a speaker module configured to be received by the L-shaped carrier, wherein the speaker module emits acoustic radiation through the channel along a radiation axis unaligned with the acoustic port axis, wherein the acoustic radiation is emitted from the temple through the acoustic port.

2. The electronic eyewear device of claim 1, wherein the internal space is elongated.

3. The electronic eyewear device of claim 1, wherein the channel extends from the speaker module to the acoustic port.

4. The electronic eyewear device of claim 1, wherein the L-shaped carrier is releasably attached to the temple internal space.

5. The electronic eyewear device of claim 4, wherein the L-shaped carrier is releasably attached to the temple internal space by a mechanical fastener.

6. The electronic eyewear device of claim 1, wherein the L-shaped carrier is affixed to the temple internal space.

7. The electronic eyewear device of claim 6, wherein the L-shaped carrier is affixed to the temple internal space by an adhesive.

8. The electronic eyewear device of claim 7, wherein the adhesive is applied to form an adhesive path that substantially corresponds to the perimeter of the L-shaped carrier.

9. The electronic eyewear device of claim 8, wherein the adhesive path confers acoustic impedance.

10. The electronic eyewear device of claim 9, wherein the thickness of at least 50% of the adhesive path is 1 millimeter or greater.

11. The electronic eyewear device of claim 1, wherein the L-shaped carrier comprises a mesh covering the channel.

12. The electronic eyewear device of claim 1, wherein the speaker module is affixed to the L-shaped carrier by mechanical fastener.

13. The electronic eyewear device of claim 1, wherein the acoustic port is positioned from the speaker module at least twice the length of the speaker module.

14. The electronic eyewear device of claim 1, further comprising electronic circuitry coupled to the frame and arranged to wirelessly transmit or receive audio signals produced by the speaker module.

15. The electronic eyewear device of claim 14, wherein the electronic circuitry comprises an antenna built into a temple.

16. A method of assembling an electronic eyewear device having improved acoustic volume, comprising:

providing an electronic eyewear device including a temple comprising a housing having an internal space and an acoustic port;

providing a speaker module comprising an audio transducer configured to receive electrical input;

attaching the speaker module to an L-shaped carrier; and attaching the L-shaped carrier to an interior surface within the temple housing, wherein the L-shaped carrier is configured to engage the interior surface to form a channel that acoustically couples the speaker module to the acoustic port, wherein the speaker module emits acoustic radiation through the channel along a radiation axis unaligned with the acoustic port axis, wherein the acoustic radiation is emitted from the temple through the acoustic port.

17. The method of claim 16, wherein the step of attaching the L-shaped carrier to the interior surface of the housing further comprises the step of applying a glue path.

18. The method of claim 17, wherein the glue path is applied to the interior surface of the temple housing.

19. The method of claim 17, wherein the glue path substantially corresponds to the perimeter of the L-shaped carrier.

20. The method of claim 16, wherein the step of attaching the speaker module to a carrier precedes the step of attaching the L-shaped carrier to an interior surface within the temple housing.

\* \* \* \* \*